(12) United States Patent  
Roush et al.

(10) Patent No.: US 8,732,489 B2  
(45) Date of Patent: May 20, 2014

(54) COMMUNICATION SYSTEM FOR USE IN HAZARDOUS ENVIRONMENTS

(75) Inventors: Susan Lee Roush, Gardnerville, NV (US); Robert Donald Hayashida, Stateline, NV (US); Mike Evans, legal representative, Gardnerville, NV (US); Nathan Andrew Weller, Gardnerville, NV (US); Michael Lee Kidd, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 314 days.

(21) Appl. No.: 13/226,940

(22) Filed: Sep. 7, 2011

(65) Prior Publication Data

US 2013/0061066 A1   Mar. 7, 2013

(51) Int. Cl.
G06F 1/00 (2006.01)
H02H 7/00 (2006.01)
H02H 11/00 (2006.01)

(52) U.S. Cl.
USPC .................... 713/300; 361/1; 361/6; 361/119

(58) Field of Classification Search
USPC ................................ 713/300; 361/1, 6, 119
See application file for complete search history.

(56) References Cited

U.S. PATENT DOCUMENTS

| 5,835,534 | A | 11/1998 | Kogure |
| 6,037,857 | A | 3/2000 | Behrens et al. |
| 6,154,683 | A | 11/2000 | Kessler et al. |
| 6,448,901 | B1 * | 9/2002 | Adams et al. ............. 340/815.45 |
| 2006/0077612 | A1 * | 4/2006 | Kothari et al. ................ 361/115 |
| 2008/0024939 | A1 | 1/2008 | Cooper |
| 2008/0276019 | A1 | 11/2008 | Schmidt et al. |
| 2008/0285186 | A1 * | 11/2008 | Kothari et al. ................... 361/56 |
| 2009/0096591 | A1 * | 4/2009 | Ito et al. .................... 340/310.11 |

* cited by examiner

*Primary Examiner* — Vincent Tran
(74) *Attorney, Agent, or Firm* — Fletcher Yoder, P.C.

(57) ABSTRACT

A communication system includes a host device and a peripheral device. The host device includes a data terminal and a power terminal. A data conductor extends between the host device and the peripheral device. The data conductor is configured to channel data between the data terminal and the peripheral device. A power conductor extends between the host device and the peripheral device. The power conductor is configured to channel power between the power terminal and the peripheral device. A zener diode couples the data conductor to the power conductor. The zener diode is configured to control a voltage channeled between the host device and the peripheral device while data is channeled through the data conductor at a desired speed that is greater than a predetermined threshold.

17 Claims, 3 Drawing Sheets

COMMUNICATION SYSTEM FOR USE IN HAZARDOUS ENVIRONMENTS

BACKGROUND

The present disclosure relates generally to communication systems and, more particularly, to a communication system for use in hazardous environments.

At least some known communication systems are positioned within environments that include explosive gases. In at least some such environments, a small spark may initiate a large explosion. To use communication systems in such environments, at least some known communication systems include wide traces, include redundant devices, and/or channel a reduced amount of voltage and/or current through the system. However, such systems generally have a relative high capacitance in its connections, printed circuit board tracks or otherwise, which may interfere with a high-speed data rate. Moreover, such interference may ultimately lead to data that becomes degraded to the point that there is at least some information loss. As such, known communication systems are dangerous, inconsistent, and/or unreliable.

BRIEF DESCRIPTION

In one aspect, a power regulation module is provided for use with a communication system including a host device and a peripheral device. The host device includes a data terminal and a power terminal. The power regulation module includes a data conductor extending between the host device and the peripheral device, a power conductor extending between the host device and the peripheral device, and a zener diode coupling the data conductor to the power conductor. The data conductor is configured to channel data between the data terminal and the peripheral device. The power conductor is configured to channel power between the power terminal and the peripheral device. The zener diode is configured to control a voltage between the host device and the peripheral device while data is channeled through the data conductor at a desired speed that is greater than a predetermined threshold.

In another aspect, a communication system is provided for use in a hazardous environment. The communication system includes a host device and a peripheral device. The host device includes a data terminal and a power terminal. A data conductor extends between the host device and the peripheral device. The data conductor is configured to channel data between the data terminal and the peripheral device. A power conductor extends between the host device and the peripheral device. The power conductor is configured to channel power between the power terminal and the peripheral device. A zener diode couples the data conductor to the power conductor. The zener diode is configured to control a voltage channeled between the host device and the peripheral device while data is channeled through the data conductor at a desired speed that is greater than a predetermined threshold.

In yet another aspect, a method is provided for use in communicating. The method includes channeling data between a host device including a data terminal and a peripheral device. The host device includes a power terminal. Power is channeled between the power terminal and the peripheral device. A voltage channeled between the host device and the peripheral device is controlled using a zener diode while data is channeled at a desired speed that is greater than a predetermined threshold.

The features, functions, and advantages described herein may be achieved independently in various embodiments of the present disclosure or may be combined in yet other embodiments, further details of which may be seen with reference to the following description and drawings.

Although specific features of various embodiments may be shown in some drawings and not in others, such illustrations are for convenience only. Any feature of a drawing may be referenced and/or claimed in combination with any feature of any other drawing.

DETAILED DESCRIPTION

The subject matter described herein relates generally to communication systems and, more particularly, to a communication system that be used in hazardous environments. In one embodiment, the communication system includes a host device, a peripheral device, and conductors that extend between the host device and the peripheral device. The host device includes a data terminal and a power terminal. In such an embodiment, a data conductor channels data between the data terminal and the peripheral device, and a power conductor channels power between the power terminal and the peripheral device. Generally, data transfer speed increases as power increases. However, power increases also increase the likelihood of energy escaping from the communication system. In the embodiments described herein, a zener diode controls the voltage supplied between the host device and the peripheral device to facilitate reducing a likelihood of energy escaping from the communication system, while maintaining data transferred through the data conductor at a desired speed that is greater than a predetermined threshold.

As used herein, the term "hazardous environment" refers to a location having a relatively high concentration of flammable gas, vapor, and/or dust. Generally, electrical equipment used in hazardous environments are designed and/or tested to ensure that such equipment does not initiate an explosion within the hazardous environment. Moreover, as used herein, an element or step recited in the singular and proceeded with the word "a" or "an" should be understood as not excluding plural elements or steps unless such exclusion is explicitly recited. Furthermore, references to "one embodiment" or to the "exemplary embodiment" are not intended to be interpreted as excluding the existence of additional embodiments that also incorporate the recited features.

Figure 1:
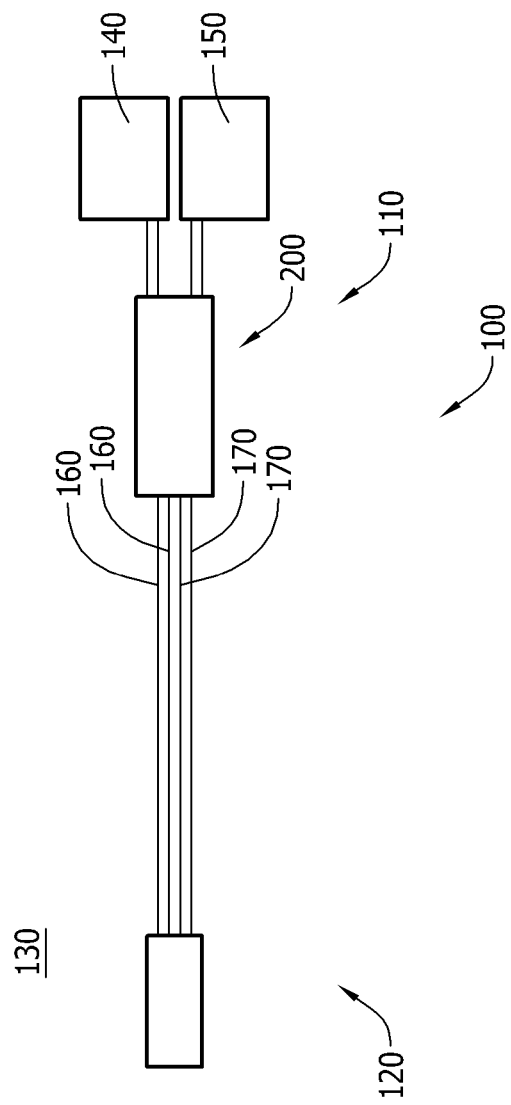
FIG. 1 is a schematic illustration of an exemplary communication system including an exemplary power regulation module.

FIG. 1 is a schematic illustration of an exemplary communication system 100. In the exemplary embodiment, communication system 100 includes a host device 110 and a peripheral device 120. More specifically, in the exemplary embodiment, host device 110 is a hand-held device that is positioned external to a hazardous environment 130, and peripheral device 120 is a remote device that is positioned within hazardous environment 130. For example, in one embodiment, peripheral device 120 is a laser tachometer. Alternatively, host device 110 and/or peripheral device 120 may be any suitable device that enables communication system 100 to function as described herein. In the exemplary embodiment, hazardous environment 130 is a location that includes a coal mining gas, methane, propane, petrol, ethylene, a coke oven gas, hydrogen, acetylene, and/or carbon disulphide.

In the exemplary embodiment, host device 110 includes at least a data terminal 140 and a power terminal 150. In the exemplary embodiment, a plurality of circuits extend between, and couple, host device 110 and peripheral device 120. For example, in the exemplary embodiment, at least one data conductor 160 extends between host device 110 and peripheral device 120 such that host device 110 is in data communication with peripheral device 120. As such, data conductor 160 enables data to be channeled between data terminal 140 and peripheral device 120. More specifically, in the exemplary embodiment, a "D+" data conductor 160 and a "D−" data conductor 160 are coupled between data terminal 140 and peripheral device 120.

Moreover, in the exemplary embodiment, at least one power conductor 170 extends between host device 110 and peripheral device 120. Power conductor 170 couples host device 110 in electric communication with peripheral device 120. Moreover, power conductor 170 enables power to be supplied between power terminal 150 and peripheral device 120. More specifically, in the exemplary embodiment, a "positive" power conductor 170 and a "ground" or reference power conductor 170 are each coupled between power terminal 150 and peripheral device 120. In the exemplary embodiment, positive power conductor 170 has a voltage between approximately 4.75 volts (v) and 5.25 v. More particularly, in the exemplary embodiment, the positive power conductor 170 has a voltage of approximately 5 v. Alternatively, power conductor 170 may have any suitable configuration that enables power regulation module 200 to function as described herein.

Figure 2:
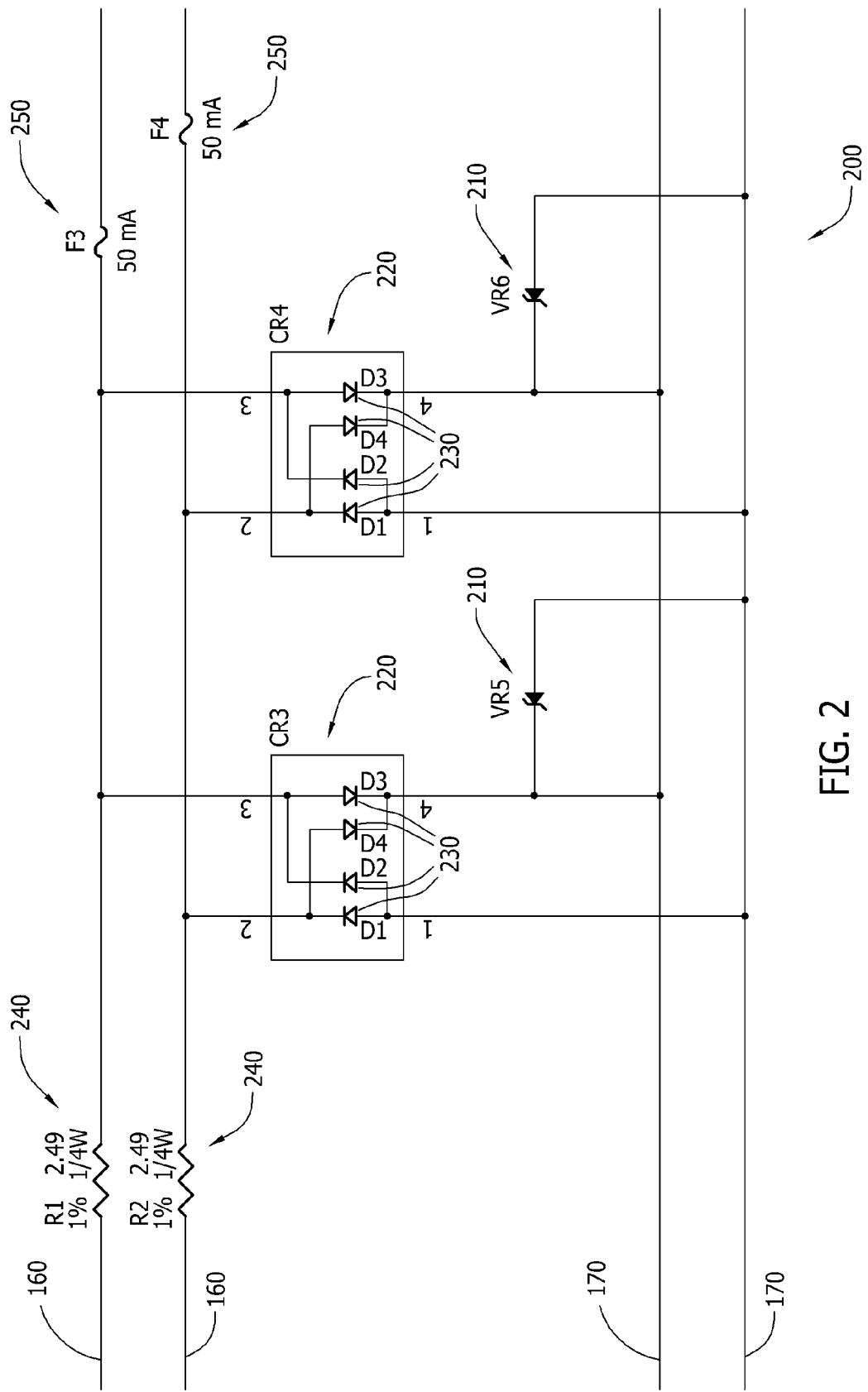
FIG. 2 is a schematic illustration of the power regulation module shown in FIG. 2.

In the exemplary embodiment, host device 110 includes a power regulation module 200. FIG. 2 is a more detailed schematic illustration of power regulation module 200 and illustrates that module 200 includes a zener diode 210 coupled between data conductor 160 and power conductor 170. In the exemplary embodiment, power regulation module 200 is an intrinsic safety device that enables at least a portion of communication system 100 to be positioned within hazardous environment 130. Moreover, in the exemplary embodiment, zener diode 210 has a capacitance between approximately 200 pF and 500 pF. Alternatively, zener diode 210 may have any suitable configuration and/or capacitance that enables power regulation module 200 to function as described herein.

In the exemplary embodiment, zener diode 210 controls the voltage transmitted between host device 110 and peripheral device 120 while data is channeled through data conductor 160 at a desired speed that is at least at a predetermined threshold. That is, the data is channeled through data conductor 160 at a speed that is greater than or equal to a predetermined threshold. In the exemplary embodiment, the predetermined threshold is greater than or equal to approximately 12 Mbit/s. More particularly, in the exemplary embodiment, the predetermined threshold is approximately 480 Mbit/s. Alternatively, the predetermined threshold may be any suitable threshold that enables power regulation module 200 to function as described herein.

In the exemplary embodiment, zener diode 210 is positioned to facilitate reducing the corruption of the data channeled through data conductor 160. More specifically, in the exemplary embodiment, a diode array 220 is coupled to zener diode 210. Diode array 220 facilitates controlling the capacitance associated with zener diode 210 such that data is able to be channeled through data conductor 160 substantially uncorrupted and/or interrupted. More specifically, in the exemplary embodiment, diode array 220 facilitates isolating the capacitance from data conductor 160 and/or power conductor 170. In the exemplary embodiment, diode array 220 includes a plurality of low-capacitance diodes 230 that each have a capacitance of approximately 3 pF. Alternatively, diodes 230 may have any suitable configuration and/or capacitance that enables power regulation module 200 to function as described herein.

In the exemplary embodiment, power regulation module 200 includes at least one resistor 240 that is coupled to data conductor 160. More specifically, in the exemplary embodiment, resistor 240 controls the current induced between host device 110 and peripheral device 120 while data is channeled through data conductor 160 at a desired speed that is greater than or equal to a predetermined threshold. Resistor 240 is a passive component that implements electrical resistance as a circuit element. In the exemplary embodiment, resistor 240 is a ¼ watt resistor. Alternatively, resistor 240 may have any suitable configuration and/or resistance that enables power regulation module 200 to function as described herein.

Moreover, in the exemplary embodiment, power regulation module 200 includes at least one fuse 250 that is coupled to data conductor 160. More specifically, in the exemplary embodiment, fuse 250 controls the current included between host device 110 and peripheral device 120 while data is channeled through data conductor 160 at a desired speed that is greater than or equal to a predetermined threshold. Fuse 250 is a passive component that interrupts the circuit when the current channeled through is greater than a fuse threshold. In the exemplary embodiment, fuse 250 is a 50 mA fuse. Alternatively, fuse 250 may have any suitable configuration and/or rating that enables power regulation module 200 to function as described herein.

In the exemplary embodiment, data conductor 160 and/or power conductor 170 has a width that enables there to be a dual redundancy of zener diodes 210 and/or diode arrays 220. In the exemplary embodiment, data conductor 160 and/or power conductor 170 has a width of greater than or equal to approximately 80 mils. Alternatively, data conductor 160 and/or power conductor 170 may have any suitable configuration that enables power regulation module 200 to function as described herein.

Figure 3:
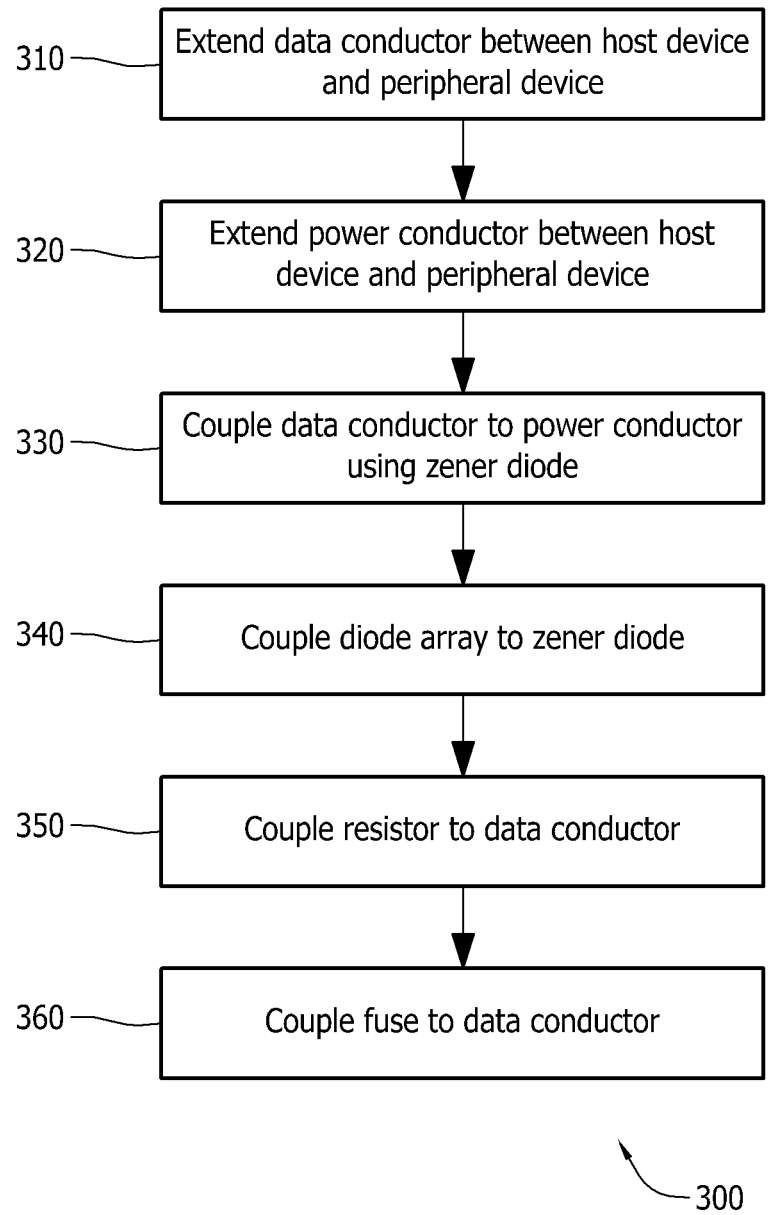
FIG. 3 is a flowchart of an exemplary method that may be used to assemble the communication system shown in FIG. 1.

FIG. 3 is a flowchart of an exemplary method 300 that may be used to assemble communication system 100. In the exemplary embodiment, data conductor 160 is extended 310 between host device 110 and peripheral device 120 such that data conductor 160 is configured to channel data between data terminal 140 and peripheral device 120. Moreover, in the exemplary embodiment, power conductor 170 is extended 320 between host device 110 and peripheral device 120 such that power conductor 170 is configured to channel power between power terminal 150 and peripheral device 120.

In the exemplary embodiment, zener diode 210 is used to couple 330 data conductor 160 to power conductor 170. As such, in the exemplary embodiment, zener diode 210 controls a voltage channeled between host device 110 and peripheral device 120 while data is channeled through data conductor 160. In the exemplary embodiment, zener diode 210 is positioned such that data channeled through data conductor 160 is substantially uncorrupted. Moreover, in the exemplary embodiment, diode array 220 is coupled 340 to zener diode 210 to facilitate isolating a capacitance associated with zener diode 210 between either data conductor 160 and either power conductor 170.

In the exemplary embodiment, resistor 240 is coupled 350 to data conductor 160 to facilitate controlling a current channeled between host device 110 and peripheral device 120. Moreover, in the exemplary embodiment, fuse 250 is coupled 360 to data conductor 160 to facilitate controlling a current channeled between host device 110 and peripheral device 120. In the exemplary embodiment, fuse 250 is positioned to facilitate protecting the power ratings on resistor 240. Moreover, in the exemplary embodiment, fuse 250 protects power ratings on zener diodes 210 and/or diode arrays 220.

A communication system is provided herein that facilitates increasing a bandwidth data transfer while maintaining the power restriction necessary in a hazardous area. To facilitate controlling the power channeled through the communication system, the embodiments described herein include a zener diode that limits the voltage, and a resistor and/or fuse that limits the current channeled through the communication system. As such, the communication system described herein facilitates limiting a potential energy that could escape into a hazardous environment. Moreover, the embodiments described herein include a diode array that facilitates isolating the capacitance associated with the zener diode from the conductive lines to facilitate reducing an amount of data interference of data transmitted through the communication system.

Exemplary embodiments of systems and methods are described and/or illustrated herein in detail. The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the invention, including the best mode, and also to enable any person skilled in the art to practice those certain embodiments, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power regulation module comprising:
    a data conductor configured to extend between a host device and a peripheral device, wherein the data conductor is configured to channel data between a data terminal and the peripheral device;
    a power conductor configured to extend between the host device and the peripheral device, wherein the power conductor is configured to channel power between a power terminal and the peripheral device;
    a zener diode coupling the data conductor to the power conductor, wherein the zener diode is configured to control a voltage between the host device and the peripheral device while data is channeled through the data conductor at a desired speed that is greater than a predetermined threshold; and
    a diode array coupled to the zener diode, wherein the diode array is configured to isolate a capacitance with the zener diode.

2. The power regulation module of claim 1, wherein the zener diode is positioned such that the data channeled through the data conductor is substantially uncorrupted.

3. The power regulation module of claim 1, comprising a resistor coupled to the data conductor, wherein the resistor is configured to control current channeled between the host device and the peripheral device while the data is channeled through the data conductor at the desired speed.

4. The power regulation module of claim 1, comprising a fuse coupled to the data conductor, wherein the fuse is configured to control current channeled between the host device and the peripheral device while the data is channeled through the data conductor at the desired speed.

5. The power regulation module of claim 1, wherein the data conductor and the power conductor each has a width of at least approximately 80 mils.

6. The power regulation module of claim 1, wherein the peripheral device is configured to be positioned within a hazardous environment including at least one of a coal mining gas, methane, propane, petrol, ethylene, a coke oven gas, hydrogen, acetylene, and carbon disulphide.

7. A communication system for use in a hazardous environment, comprising:
    a host device comprising a data terminal and a power terminal;
    a peripheral device;
    a data conductor extending between the host device and the peripheral device, wherein the data conductor is configured to channel data between the data terminal and the peripheral device;
    a power conductor extending between the host device and the peripheral device, wherein the power conductor is configured to channel power between the power terminal and the peripheral device;
    a zener diode coupling the data conductor to the power conductor, wherein the zener diode is configured to control a voltage channeled between the host device and the peripheral device while data is channeled through the data conductor at a desired speed that is greater than a predetermined threshold; and
    a diode array coupled to the zener diode, wherein the diode array is configured to isolate a capacitance with the zener diode.

8. The system of claim 7, wherein the zener diode is positioned such that the data channeled through the data conductor at the desired speed is substantially uncorrupted.

9. The system of claim 7, comprising, a resistor coupled to the data conductor, wherein the resistor configured to control current channeled between the host device and the peripheral device while the data is channeled through the data conductor at the desired speed.

10. The system of claim 7, comprising a fuse coupled to the data conductor, wherein the fuse is configured to control current channeled between the host device and the peripheral device while the data is channeled through the data conductor at the desired speed.

11. The system of claim 7, wherein the data conductor and the power conductor each have a width of at least approximately 80 mils.

12. The system of claim 7, wherein the peripheral device is configured to operate within a hazardous environment including at least one of a coal mining gas, methane, propane, petrol, ethylene, a coke oven gas, hydrogen, acetylene, and carbon disulphide.

13. A method of communicating, comprising:
    channeling data between a host device and a peripheral device, wherein the host device comprises a data terminal and a power terminal;
    channeling power between the power terminal and the peripheral device;

controlling, using a zener diode, a voltage channeled between the host device and the peripheral device while data is channeled at a desired speed that is greater than a predetermined threshold; and isolating, using a diode array coupled to the zener diode, a capacitance with the zener diode.

14. The method of claim 13, wherein controlling the voltage comprises positioning the zener diode such that the data channeled at the desired speed is substantially uncorrupted.

15. The method of claim 13, comprising controlling, using a resistor, current channeled between the host device and the peripheral device while the data is channeled through the data conductor at the desired speed.

16. The method of claim 13, comprising controlling, using a fuse, current channeled between the host device and the peripheral device while the data is channeled through the data conductor at the desired speed.

17. The method of claim 13, comprising positioning the peripheral device within a hazardous environment including at least one of a coal mining gas, methane, propane, petrol, ethylene, a coke oven gas, hydrogen, acetylene, and carbon disulphide.

* * * * *